United States Patent [19]
Puckette

[11] 3,973,089
[45] Aug. 3, 1976

[54] ADAPTIVE HYBRID CIRCUIT

[75] Inventor: Charles McD. Puckette, Scotia, N.Y.

[73] Assignee: General Electric Company, Schenectady, N.Y.

[22] Filed: June 25, 1975

[21] Appl. No.: 590,379

Related U.S. Application Data

[63] Continuation-in-part of Ser. No. 410,474, Oct. 29, 1973, abandoned.

[52] U.S. Cl. .......................................... 179/170 NC
[51] Int. Cl.² ............................................. H04B 1/58
[58] Field of Search .................. 179/170 R, 170 NC

[56] References Cited
UNITED STATES PATENTS

| | | | |
|---|---|---|---|
| 3,180,947 | 4/1965 | Haselton, Jr. et al.............. | 179/170 |
| 3,480,742 | 11/1969 | Gaunt, Jr. ..................... | 179/170 NC |
| 3,530,260 | 9/1970 | Gaunt, Jr. ..................... | 179/170 NC |
| 3,586,881 | 6/1971 | Gaunt, Jr. ..................... | 179/170 NC |
| 3,700,831 | 10/1972 | Aagaaro et al................ | 179/170 NC |
| 3,855,430 | 12/1974 | Colardelle et al............ | 179/170 NC |

*Primary Examiner*—Kathleen H. Claffy
*Assistant Examiner*—Randall P. Myers
*Attorney, Agent, or Firm*—Stephen B. Salai; Joseph T. Cohen; Jerome C. Squillaro

[57] ABSTRACT

Improved isolation between the four-wire receive and transmit ports in a four wire-to-wire converter in a communication system is obtained by utilizing a tapped delay line network in an active hybrid circuit. The active hybrid circuit includes a first amplifier which terminates the four-wire receive channel in its characteristic impedance, amplifies the four-wire received signal, and excites a resistor network that terminates the two-wire channel in its nominal characteristic impedance. A second amplifier and a resistor circuit function as a weighted summer for nulling the received four-wire signal with the signal passing through the resistor network to obtain signal cancellation at the four-wire transmit port when the four-wire receive channel is activated. The tapped delay line network may be connected either between the first amplifier and resistor network or between the first amplifier and the received four-wire signal input of the second amplifier.

24 Claims, 4 Drawing Figures

ADAPTIVE HYBRID CIRCUIT

This is a continuation-in-part of application Ser. No. 410,474 filed Oct. 29, 1973, now abandoned.

My invention relates to an interface between a full-duplex communication channel and a half-duplex channel, and in particular, to a circuit utilizing a tapped delay line network and operational amplifiers for providing improved isolation between the full-duplex ports without the need for an externally adjustable compromise termination network which is conventionally utilized when the half-duplex channel has variable impedance characteristics.

Various type communication systems employ combinations of four-wire and two-wire lines, a typical example being a telephone communication system wherein the long distance telephone line, generally described as a full-duplex channel, is of the four-wire type wherein two wires are utilized for transmitting the long distance signal in one direction, and the other two wires are utilized for transmitting the signal in the opposite direction. Thus, the full-duplex channel consists of four wires whereas the half-duplex channel is a two-wire channel for transmitting the signals in both directions along the local telephone lines. Another example of a full-duplex channel is a radio transceiver that transmits and receives on separate frequencies.

A component necessary in the communication systems described hereinabove is an interface between the full-duplex channel and half-duplex channel in order to convert the four-wire channel to the two-wire channel in the receive mode and vice versa in the transmit mode of operation. The purpose of any four wire-to-two wire converter is to obtain isolation between the full-duplex receive and transmit channels while allowing signals being received from the full-duplex channel to pass unattenuated from the full-duplex channel to the half-duplex channel, and likewise for signals received from the half-duplex channel to pass unattenuated to the full-duplex transmit channel. The isolation is necessary in order to prevent oscillation on the four-wire line since signals may be amplified by the full-duplex channel amplifiers to a level where the loop gain exceeds unity. The conventional solution to the interface problem in the telephone industry is the use of a transformer hybrid circuit. However, the isolation between the full-duplex receive and transmit ports of the transformer hybrid is strongly dependent on the match that exists between the input impedance of a compromise termination network and the input impedance of the half-duplex channel so that such hybrids exhibit variable isolation characteristics when used with a switched two-wire network. When the half-duplex channel has fixed characteristics, it is possible to achieve 20 to 30 dB of isolation by obtaining a relatively precise match between the compromise network and the half-duplex channel input impedance. But in the more general case wherein the half-duplex channel impedance is variable, such as in the case of a two-wire local telephone line where the lines are switched in accordance with the number being dialed, the compromise termination network can only be matched to some average impedance characteristic of the half-duplex channel; as a result, typical isolation between the full-duplex channel receive and transmit ports is on the order of 15 dB or less. In addition, the loss between the four-wire receive and two-wire ports (which is a minimum of 3 dB due to the power distribution in the transformer hybrid circuit) imposes system signal level constraints that may be difficult to reconcile with achieveable isolation levels.

Another approach that provides an improved full duplex-to-half duplex interface and which does not result in the performance of the interface being a strong function of the impedance balance between a compromise termination network and the half-duplex channel input impedance as in the case of the transformer hybrid, and does not require a decision be made as to whether a signal is being received at the four-wire receive port as in the case of a circuit disclosed in U.S. Pat. No. 3,189,693 Fudaley, is the active hybrid circuit. The active hybrid is a circuit utilizing active components such as electronic operational amplifiers as disclosed in U.S. Pat. No. 3,480,742 to Gaunt and in my concurrently filed patent application Ser. No. 410,459, now abandoned, "Improved Active Hybrid Circuit". The active hybrid circuit disclosed in the Gaunt patent requires three amplifiers, whereas applicant's single-ended embodiment requires only two amplifiers, and the Gaunt circuit also requires an impedance that must be constantly adjusted to match the actual input impedance of the half-duplex channel when it has variable impedance characteristics. The active hybrid circuit disclosed and claimed in my concurrently filed patent application provides an isolation between the four-wire receive and transmit ports which is at least 6 dB better than that observed with a conventional transformer hybrid circuit. Although the performance of my improved active hybrid has been demonstrated to be satisfactory in a variety of telephone systems, improving the performance of the full duplex-to-half duplex interface with an even higher degree of isolation between the four-wire receive and transmit ports will allow further optimization of system levels.

Therefore, one of the principal objects of my invention is to provide a full duplex-to-half duplex interface having an improved isolation characteristic between the four-wire receive and transmit ports that is independent of the variation of the impedance characteristics of the half-duplex channel.

Another object of my invention is to provide the interface without the need for an externally adjustable compromise terminating network and adjusting such network whenever the half-duplex channel is changed such that the performance of the interface will not be a strong function of the impedance balance between the compromise network and half-duplex channel.

A further object of my invention is to provide the improved interface whose isolation is independent of the received signal level from the four-wire receive port.

An adaptive active hybrid circuit should yield a higher performance than the active hybrid circuit since the adaptive feature permits a higher degree of control of the particular circuit function which accomplishes the isolation between the four-wire receive and transmit ports. In the prior art, there is disclosed an adaptive hybrid transformer circuit in an article entitled "An Adaptive Electronic Hybrid Transformer" by Stanley A. White in the IEEE Transactions On Communications, December 1972, pages 1184–1188. The hybrid described in the White article uses a voltage controlled resistor-capacitor network whereas in my invention to be described hereinafter, I utilize a trapped delay line network and an impedance buffering pad. As a result, the isolation performance of the hybrid described in the White article is limited by the ability of the resistor-capacitor network to match the input impedance characteristics of the half-duplex channel. A tapped delay line network, being a general network synthesizer, readily matches a variety of input impedance characteristics thereby insuring the much higher level of signal nulling at the four-wire transmit port in my invention than is possible in the adaptive transformer hybrid circuit described in the White article. Finally, since the performance of the active hybrid circuit is significantly superior to that of the conventional transformer hybrid circuit, it follows that the tapped delay line network in the adaptive active hybrid circuit of my present invention need not perform to the same level that would be necessary if the tapped delay line network simply replaced the resistor-capacitor network. Thus, my adaptive hybrid circuit obtains a higher performance than that attained with either the active hybrid circuit or the adaptive hybrid transformer circuit described in the White article.

Therefore, another object of my invention is to provide an improved adaptive active hybrid circuit which is of simple structure and results in a higher degree of isolation than that obtained with an active hybrid or an adaptive electronic hybrid transformer circuit.

Briefly summarized, my invention is a four wire-to-two wire converter for interfacing a full-duplex channel to a half-duplex channel in a communication system. The converter utilizes four electronic amplifiers in a balanced output embodiment of the circuit. A first of the amplifiers terminates the four-wire receive channel in its characteristic impedance and the output thereof is connected to a fixed resistor network which terminates the two-wire channel in its nominal characteristic impedance and functions to swamp out variations in the two-wire channel input impedance. A second amplifier has its output connected to the four-wire transmit port and terminates the four-wire transmit channel in its characteristic impedance. The second amplifier and a resistor circuit at the input thereof function as a weighted summer for algebraically summing a sample of the four-wire received input signal with the signal sensed in the two-wire channel terminating resistor network. An impedance synthesizer network provides improved signal cancellation in the second amplifier and thereby achieves improved isolation between the four-wire receive and transmit ports. The impedance synthesizer network is connected between the output of the first amplifier and the input to the two-wire channel terminating resistor network in a first embodiment and between the output of the first amplifier and an input to the second amplifier in a second embodiment thereof.

The features of my invention which I desire to protect herein are pointed out with particularity in the appended claims. The invention itself, however, both as to its organization and method of operation together with further objects and advantages thereof may best be understood by reference to the following description taken in conjunction with the accompanying drawing wherein like parts in each of the several figures are identified by the same reference character and wherein:

Figure 1:
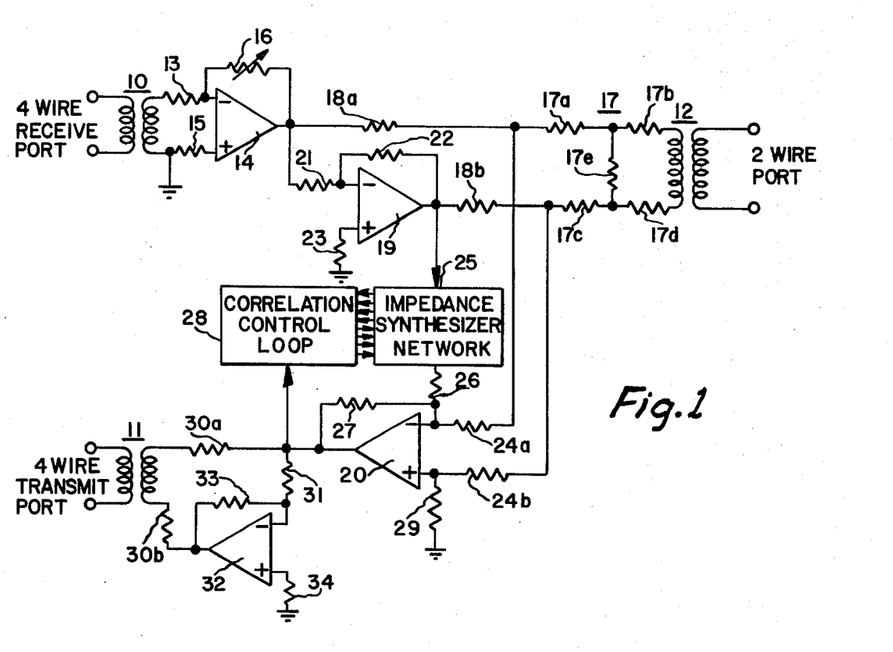
FIG. 1 is a schematic diagram of a first balanced output embodiment of my adaptive hybrid circuit.

Referring now in particular to FIG. 1, there is shown a first balanced output embodiment of my adaptive hybrid circuit that provides considerably improved isolation between the full-duplex ports (in the order of at least 12 dB improvement) over the conventional transformer hybrid, and at least 6 dB improvement over the active hybrid described and claimed in my aforementioned concurrently filed patent application. My present invention provides the improved isolation without the need for an externally adjustable compromise termination network as in the case of the transformer hybrid circuit, and unity gain between the four-wire receive and two-wire ports; and the four-wire receive-to-transmit port isolation being relatively independent of the input impedance of the half-duplex channel. Thus, my adaptive hybrid circuit is especially useful in applications where the half-duplex channel is switched (i.e., the input impedance is variable) such as in the case of conventional two-wire local telephone lines.

Referring now to the details of the FIG. 1 circuit, the primary winding of a first transformer 10 is connected across the full-duplex channel receive port which corresponds to the receive port of the long distance telephone line in a telephone communication system application. The secondary winding of a second transformer 11 is connected across the full-duplex transmit port, and the primary winding of a third transformer 12 is connected across the half-duplex channel port. Transformers 10, 11 and 12 function as d.c. isolators for my adaptive hybrid circuit. In some applications, this transformer interface may not be required and such transformers are then omitted. Alternative methods for implementing the interface include the use of capacitors or electronic amplifiers with differential inputs so as to provide a balanced interface circuit for the two-wire and four-wire ports.

One end of the secondary winding of transformer 10 is connected through resistor 13 to the negative polarity input terminal of an electronic amplifier 14 which typically may be an operational amplifier. The other end of the secondary winding transformer 10 is connected to a reference (ground in this particular case) which serves as the a.c. ground for the circuit. A resistor 15 is connected from the positive polarity input terminal of amplifier 14 to ground for minimizing the offset voltage of the amplifier with temperature drift in accordance with well known electronic design practice. Transformer 10 is thus also utilized to provide a balanced-to-unbalanced interface between the four-wire channel receive port and my adaptive hybrid circuit since amplifier 14 has a single-ended signal input. If amplifier 14 has a balanced input, and the four-wire receive channel is free of d.c. voltages such as are commonly used in the telephone industry for signalling and control, transformer 10 may be eliminated. Resistor 13 serves the function of terminating the receive channel in its characteristic impedance. A variable resistor 16 is connected from the output of amplifier 14 to the negative polarity input thereof to provide negative feedback and a gain adjustment wherein the gain is the ratio of the resistances of resistor 16 to the resistor 13.

The full-duplex channel receive signal is both amplified and 180° phase inverted by amplifier 14, and this amplified signal drives a fixed impedance buffering pad network 17 having a characteristic impedance which provides an impedance match to the nominal characteristic impedance of the two-wire channel. The impedance buffering pad 17 may conveniently be in the form of a balanced fixed resistor network commonly described as a resistive H pad network which is comprised of equal resistance resistors 17a and 17b in one leg thereof and the same value resistor 17c and 17d in the other leg. A fifth resistor 17e interconnects the two legs of the H network at their mid-points. A pair of resistors 18a and 18b, each of resistance equal to one half the nominal characteristic impedance of the two-wire channel (assuming the output impedance of amplifiers 14, 19 is near zero) interconnected between the outputs of amplifier 14 and a second amplifier 19 and the input to the resistive H pad network 17 from the side opposite the two-wire channel, and serve to properly terminate the H pad and to develop a balanced voltage signal at the juncture of resistors 18a, 18b and the input to the resistive H pad 17 which, besides being applied to the two-wire port, is also applied to a differential input of a third amplifier 20. If amplifier 14 has differential outputs, amplifier 19 may be eliminated, and resistors 18a and 18b are then connected to the differential outputs. The resistance value of resistor 16 is adjusted so that the gain of amplifier 14 circuit compensates for signal loss in the resistive H pad network 17 and thereby provides a zero dB loss between the four-wire receive and two-wire ports. The signal loss suffered in the resistive H pad 17 effectively swamps out variations in input impedance of the two-wire channel and thereby desensitizes the isolation between the four-wire receive and transmit ports with respect to impedance change in the two-wire channel.

Amplifier 19 functions as a unity gain inverter to provide a balanced output to the two-wire port and has its negative polarity input terminal connected by means of resistor 21 to the output of amplifier 14. A resistor 22 having the same resistance value as resistor 21 is connected from the output of amplifier 19 to the negative polarity input terminal thereof to obtain the unity gain. A resistor 23 is connected from the positive polarity input terminal of amplifier 19 to the a.c. ground reference for the same purpose as resistor 15. And as noted above, if amplifier 14 is of the balanced output type, amplifier 19 may be eliminated. The balanced input to the resistive H pad network 17 taken across the juncture of network 17 and resistors 18a and 18b, is supplied as a differential input to the negative and positive polarity input terminals of amplifier 20 by means of equal resistance value input resistors 24a and 24b.

In my concurrently filed patent application, a 180° phase-inverter version of the full-duplex receive signal is applied to a second input of amplifier 20 by means of a "balance adjust" resistor and is vectorially summed with the differential signal developed at the juncture of resistors 18a, 18b and the resistive H pad network 17. The "balance" resistor is then adjusted to obtain a balance of the amplifier 20 input signals and resultant signal cancellation at the four-wire transmit port when the four-wire receive channel is activated, that is, is receiving signals. In contradistinction to my copending patent application, in the present invention, I utilize an impedance synthesizer network 25 for applying the input signal to the negative polarity input terminal of amplifier 20. In FIG. 1, the output to network 25 is from the output of inverter 19 (or from the second output of amplifier 14 if it is of the balanced output type). Alternatively, the input to network 25 may be from the output of amplifier 14 (but with a corresponding phase reversal at the input to amplifier 20), or from the juncture of the secondary winding of transformer 10 and resistor 13. It is to be understood that while the input to impedance synthesizer 25 may be taken as desired from any of the aforementioned locations in the circuit as hereinabove described, that as will be apparent to one skilled in the art compensating changes in the connection to amplifier 20 must be made in order to insure that cancellation of the full duplex received signals occurs. For example, where the signals apply to amplifier 20 which are desired to be canceled, that is to say the output of impedance synthesizer 25 and the signal derived from the connection to attenuator 17 are in phase, these signals must be applied to opposite polarity inputs to amplifier 20 as illustrated, for example, in FIG. 1. The advantage of the impedance synthesizer network 25 is that it provides substantially improved performance over that obtained with a variable resistor since it can readily match a variety of impedance characteristics (i.e., phase and amplitude) and thus the hybrid circuit is described as being adaptive, whereas the variable resistor merely controls the amplitude. Thus, the impedance synthesizer network obtains the nulling of the signals at the output of amplifier 20 with a much higher degree of precision than that obtained with a variable resistor. The impedance systhesizer network 25 is considered to have a substantially zero output impedance so that a resistor 26 at the output thereof functions as the input resistor to amplifier 20 for the purposes of determining the gain of that particular input thereto. A resistor 27 is connected around amplifier 20 from the output to the negative polarity input terminal thereof. A resistor 29 having a resistance value equal to that of resistor 27, and connected from the positive polarity input terminal of amplifier 20 to the a.c. ground, functions to provide a differential gain for the amplifier 20 circuit equal to the resistance ratio of resistors 27 and 24a. Resistors 24a, 24b, 26, 27, 29 and the amplifier 20 comprise a weighted summer that vectorially sums the signal at the junctures of resistors 18a, 18b and the resistive H pad network 17 with a sample of the full-duplex received signal. Since these two signals are 180° phase inverted with respect to each other, the weighted summer network described hereinabove nulls the two signals at the four-wire transmit port, that is, obtains signal cancellation at such port.

Figure 3:
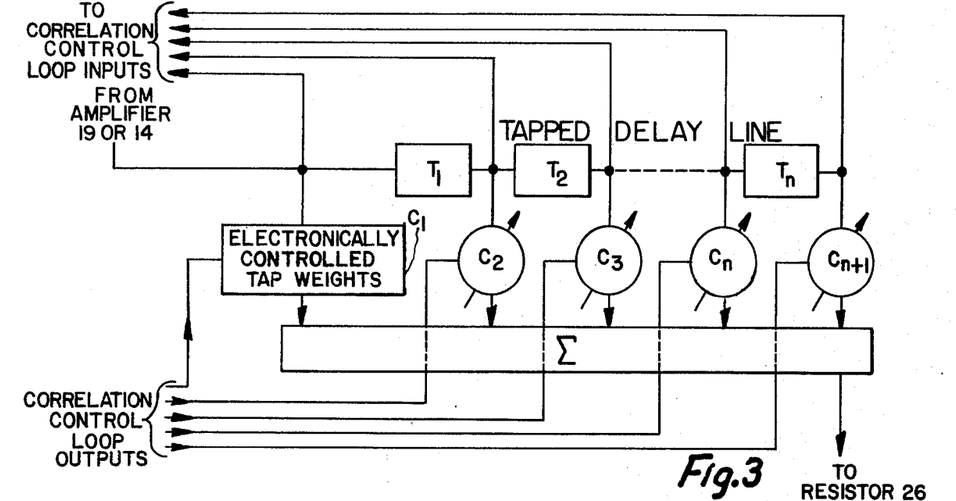
FIG. 3 is a block diagram of an impedance synthesizer network that can be used in my adaptive hybrid circuit.

The impedance synthesizer network 25 is electronically adjusted to obtain the proper weighting ratio (balance control) which will yield the desired signal cancellation so that the signal received at the four-wire receive port will not be coupled to the four-wire transmit port, or at least will be very substantially attenuated at the transmit port. The impedance synthesizer network 25 may be either automatic or adaptive, that is, the impedance may be electronically adjusted at the beginning of the system operation and then fixed for the duration of the operation, or continuously controlled during the operation of the communication system. The automatic mode of operation would be established by enabling the control function by normal system signalling signals and allowing the network adjustment process to converge to a final value during the first few seconds that the two-wire channel is connected to the hybrid. A time-out circuit would then freeze the impedance synthesizer network values for the remainder of the connection. The adaptive mode differs from the automatic mode of operation in that the control function is allowed to operate continuously. As one example, the impedance synthesizer network 25 may be a tapped delay line network as illustrated in FIG. 3, and the tap weights thereof are adjusted by means of a suitable control function using, for example, a correlation process generated in a correlation control loop 28 so that the two signals applied to the vector summing amplifier 20 are substantially identical. The correlation control loop circuit 28 has a first input (the "input" signal) supplied from the output of amplifier 14, a second input (the "error" signal) from the output of amplifier 20, a third input from the delay line taps, and its output is applied to the tap weights of the tapped delay line network 25. The details of a typical automatic impedance synthesizer network and correlation control loop are described in an article "An Automatic Equalizer For General-Purpose Communication Channels" by R. W. Lucky and H. R. Rudin, in the November 1967 issue of the *Bell System Technical Journal*, on pages 2179 to 2208. The correlation control loop is a minimum mean squared error control process implemented by cross-correlation of the "error" signal with the "input" signal.

The output of amplifier 20 is connected through a resistor 30a to one side of the primary winding of transformer 11. The output of amplifier 20 is also connected through an input resistor 31 to a negative polarity input terminal of amplifier 32 which functions as a unity gain inverter. The output of amplifier 32 is connected in negative feedback relationship to the negative input terminal thereof through a resistor 33 having a resistive value equal to that of resistor 31 to thereby obtain unity gain. A resistor 34 is connected from the positive polarity input terminal of amplifier 32 to the a.c. ground for the same purpose as resistors 15 and 23. The output of amplifier 32 is connected to the second end of the primary winding of transformer 11 through a resistor 30b having resistance value equal to that of resistor 30a in order to provide a balanced output at the four-wire transmit port. Resistors 30a, 30b, each being of resistance equal to one half the characteristic impedance of the four-wire transmit channel, function to terminate the four-wire transmit channel in its characteristic impedance. Again, as in the case of amplifier 14, if amplifier 20 is of the balanced output type, the inverter 32 and its input and feedback resistors can be eliminated.

The above discussion has described the signal being received at the four-wire receive port from the four-wire receive channel and coupled to the two-wire port and isolated from the four-wire transmit port. In the case of a signal being received at the two-wire port from the two-wire channel, the only signal passed to the input of amplifier 20 is from the output of resistive pad 17 since resistors 18a and 18b are essentially terminated in zero impedance thereby preventing any signal from coupling to amplifier 20 via resistor 26 and preventing signal nulling from occurring. The two-wire received signal developed at the juncture of resistors 18a, 18b and the resistive H pad network 17 is attenuated with respect to its received level by the attenuation of the H pad and then is amplified by amplifier 20 in accordance with the ratio of resistor 27 divided by resistors 24a, 24b (thereby providing a means to compensate for signal loss in the resistive H pad network, if desired). Since the nominal H pad loss is less than the loss required to establish typical system levels in a telephone application, amplifier 20 is commonly operated at unity gain.

Figure 2:
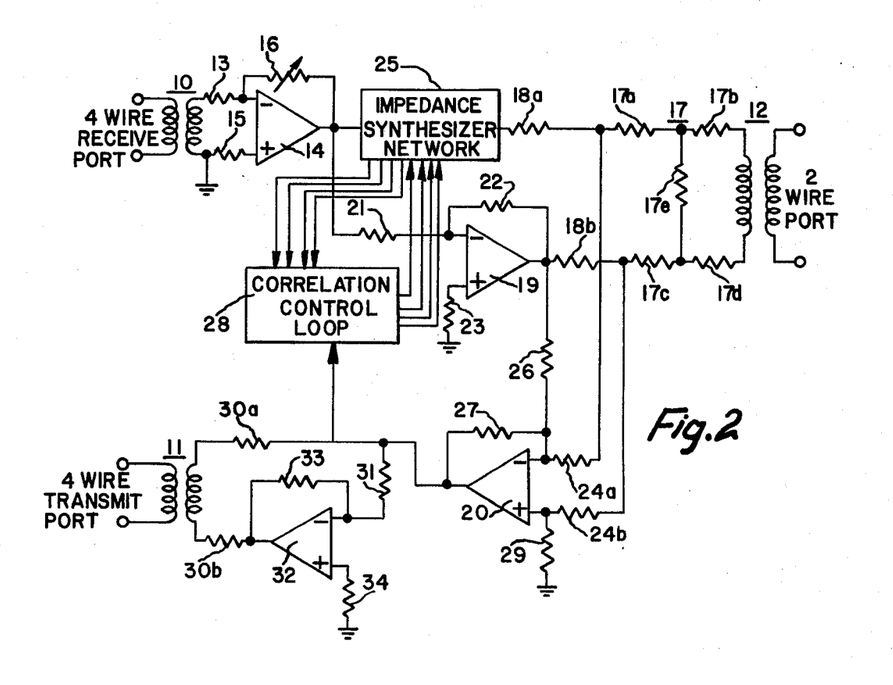
FIG. 2 is a schematic diagram of a second embodiment of my balanced output adaptive hybrid circuit.

Referring now to FIG. 2 there is shown a second balanced output embodiment of my adaptive hybrid circuit which differs from the FIG. 1 embodiment in the fact that the automatic impedance synthesizer network 25 is connected between the output of amplifier 14 and the input end of the H pad terminating resistor 18a as opposed to connecting such network 25 between the output of amplifier 19 and the input of amplifier 20 in the FIG. 1 embodiment. In all other details, the two circuits are identical. Thus, the loss of signals suffered in the resistive H pad 17 (but compensated for by gain adjustment 16) again effectively swamps out the effect of input impedance variations in the two-wire channel and thereby desensitizes the four-wire receive-to-transmit port isolation of the adaptive hybrid circuit with respect to two-wire input impedance variation as in the case of the FIG. 1 embodiment. The balanced input to the resistive H pad 17 from amplifiers 14 and 19 is again supplied as a differential second input to amplifier 20 with the proper polarity phasing at such amplifier input in order to obtain the desired nulling at the output thereof. Inverters 19 and 32 may again be eliminated if amplifiers 14 and 20 are of the balanced output type. The impedance synthesizer network 25 may alternatively be connected between the juncture of resistors 22 and 26 and the input end of resistor 18b. Again, the network 25 will not affect the two-wire signal when it is being transferred to the four-wire transmit port.

The impedance synthesizer network 25 in both the FIGS. 1 and 2 embodiments obtains a precise null at the output of amplifier 20 and thereby provides full-duplex receive-to-transmit port isolation which is improved at least 12 dB over the conventional transformer hybrid circuit and at least 6 dB over the active hybrid circuit described and claimed in my concurrently filed patent application, and is independent of impedance variation in the two-wire channel. As a typical example, for a telephone line application, the characteristic impedance of the two-wire channel and the four-wire transmit and receive channels is each 600 ohms such that the resistance of each of resistors 18a, 18b, 30a and 300 ohms. Each of amplifiers 14, 19, 20 and 32 is one half of a 747 type operational amplifier manufactured by Fairchild Semiconductor, a division of Fairchild Camera and Instrument Co. Resistor 13 is 600 ohms, resistor 16 has a maximum resistance of 5000 ohms, resistors 17 a–d are each of 150 ohms resistor 17e is of 422 ohms, resistors 21, 22, 24a, 24b, 27, 29, 31 and 33 are each of 10,000 ohms, resistor 15 is of 470 ohms and resistors 23 and 34 are 4,700 ohms. The d.c. power supply terminals to the operational amplifiers would typically be connected to $\pm 15$ volts, but are not shown for purposes of simplicity.

FIG. 3 illustrates a typical tapped delay line network that can be utilized as the impedance synthesizer network 25 in FIGS. 1 and 2. The tapped delay line comprises a plurality of cascaded time delay sections designated in FIG. 3 as $T_1, T_2 \ldots T_n$, and the delay line is tapped at the intervals $T_1, T_2 \ldots T_n$ associated with each section. The tapped delay line further comprises a plurality of adjustable tap weights $C_1, C_2 \ldots C_n, C_n{^+}_1$ and a summing network Σ. The time delay sections (circuits) may be of the passive type such as LC delay lines, but preferably are of the active type such as charge transfer devices. The adjustable tap weights connected at the tap points of the delay line provide the variable attenuation in the connections between the delay line taps and the input to a conventional summing amplifier. The adjustable tap weights are conventional attenuator circuits which may, for example, each comprise a field effect transistor and variable resistor circuit. Thus the tap weights are electronically controlled tap weights, and their control is obtained from the outputs of the correlation control loop 28. In like manner, the signals at the delay line taps are applied to inputs of the correlation control loop. In the adaptive mode of operation of the impedance synthesizer network 25, the tap weights would be continuously controlled.

Figure 4:
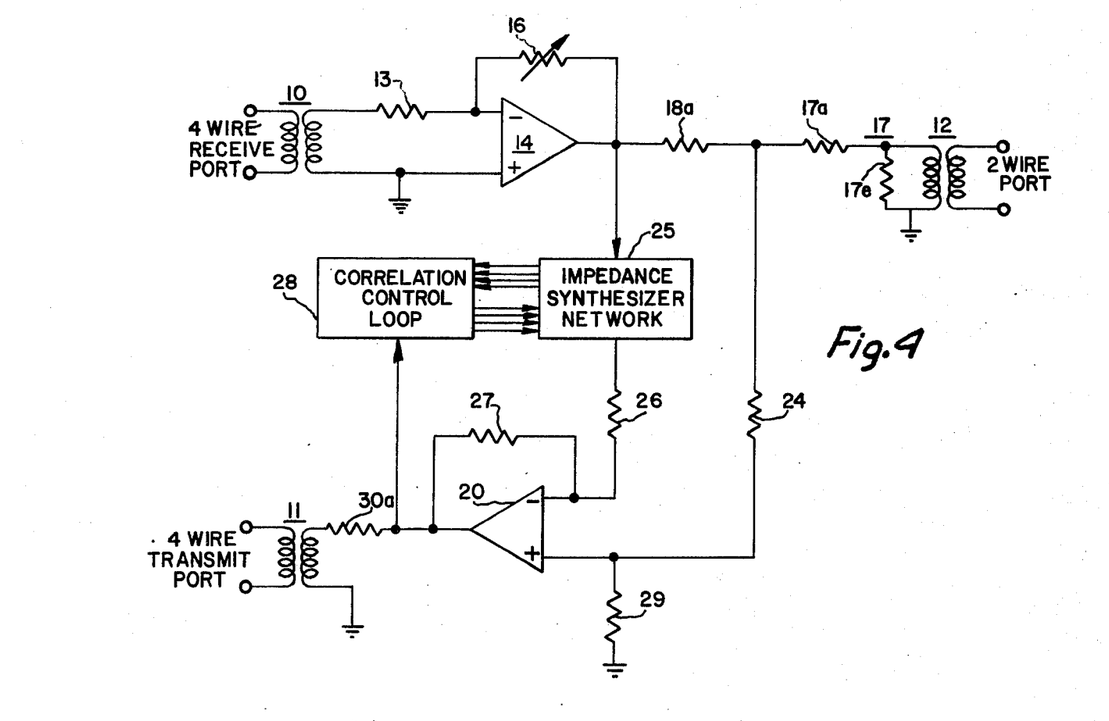
FIG. 4 is a schematic diagram of a single-ended embodiment of my adaptive hybrid circuit.

The above-described hybrid circuits provide a balanced output across transformer 11 in the case of a signal being received from the two-wire channel, and provide a like balanced output across transformer 12 in the case of a four-wire receive input signal with the inherent 6 dB increase in dynamic range over that obtained if such circuits were of the single-ended type. The two circuits of FIGS. 1 and 2 can readily be transformed to the single-ended embodiment (with the omission of inverters 19 and 32) by one skilled in the art, and especially with reference to my concurrently filed patent application. Referring specifically to FIG. 4, there is shown in schematic form an unbalanced input and output embodiment of this invention. Like reference numerals designate parts performing like functions to those of FIGS. 1 and 2 hereinabove described. The primary winding of a first transformer 10 is connected across the full duplex channel receive port which corresponds to the receive port of the long distance telephone line in a telephone communication system application. The secondary winding of a second transformer 11 is connected across the full duplex transmit port, and the primary winding of a third transformer 12 is connected across the half duplex channel port. Transformers 10, 11 and 12 function as d.c. isolators for my adaptive hybrid circuit. In some applications, this transformer interface may not be required and such transformers are then omitted. Alternative methods for implementing the interface include the use of capacitors or electronic amplifiers.

One end of the secondary winding of transformer 10 is connected through resistor 13 to the negative polarity input terminal of an electronic amplifier 14 which typically may be an operational amplifier. The other end of the secondary transformer winding 10 is connected to a reference (ground in this particular case) which serves as the a.c. ground for the circuit. In this embodiment, the positive input terminal of amplifier 14 is connected to the reference. It is to be understood that the input configuration of FIGS. 1 and 2 may be used where it is desirable to minimize the offset voltage of the amplifier with temperature drift. Resistor 13 serves the function of terminating the receive channel in its characteristic impedance. A variable resistor 16 is connected from the output of amplifier 14 to the negative polarity input thereof to provide negative feedback and a gain adjustment wherein the gain is the ratio of the resistances of resistor 16 to resistor 13.

The full-duplex channel receive signal is both amplified and 180° phase inverted by amplifier 14 and this amplified signal drives a fixed impedance buffering pad network 17 having a characteristic impedance which provides an impedance match to the nominal characteristic impedance of the two-wire channel. The impedance buffering pad 17 may conveniently be in the form of an unbalanced fixed resistor network commonly described as a resistive L-pad network which is comprised of resistors 17a and 17e. Resistor 18a is connected between the output of amplifier 14 and the input to the resistive L-pad network 17 to properly terminal the L-pad and to develop a voltage signal at the juncture of resistors 18a and 17a which besides being applied to the two-wire port is also applied to a differential input of a third amplifier 20. The resistance value of resistor 16 is adjusted so that the gain of amplifier 14 circuit compensates for signal loss in the resistive L-pad network 17 and thereby provides a 0dB loss between the four-wire receive and two-wire port. The signal loss suffered in the resistive L-pad 17 effectively swamps out variations in input impedance of the two-wire channels and thereby desensitizes the isolation between the four-wire receive and transmit ports with respect to impedance change in the two-wire channel.

Impedance synthesizer network 25 applies the input signal to the negative polarity input terminal of amplifier 20. In FIG. 4 the input to network 25 is from the output of amplifier 14. The function of impedance synthesizer network 25 is as hereinabove described in conjunction with FIGS. 1 and 2. The impedance synthesizer network 25 is considered to have a substantially zero output impedance so that a resistor 26 at output thereof functions as the input resistor to amplifier 20 for the purposes of determining the gain of that particular input thereto. A resistor 27 is connected around amplifier 20 from the output to the negative polarity input thereof. A resistor 29 having a resistance value equal to that of resistor 27 is connected from the positive polarity input terminal of amplifier 20 to the a.c. ground. Resistors 24a, 26, 27 and 29 comprise a weighted summer that vectorially sums the signal at the junctures of resistors 18a and 17a with a sample of the full duplex received signal as derived from impedance synthesizer 25. Since these two signals are 180° phase inverted with respect to each other by amplifier 20, the weighted summer network described hereinabove nulls the two signals at the four-wire port, that is, obtains signal cancellation at such port.

It is apparent from the foregoing that my invention attains the objectives set forth in that it provides an improved full duplex-to-half duplex interface having significantly improved isolation characteristics over that of the conventional transformer hybrid, the adaptive transformer hybrid and the active hybrid circuit disclosed in my concurrently filed application, and which are independent of impedance variation in the half-duplex channel as well as being independent of the signal being received. Other major features of my invention are: (1) no externally adjustable compromise termination network is required, (2) only four amplifiers (or two amplifiers of the balanced output type) are required in a balanced output embodiment to thereby provide a simplified circuit compared to the prior art, and (3) no attenuation is suffered by the signal in its passage through the hybrid circuit.

Having described two embodiments of my adaptive hybrid circuit, it is believed that modification and variation of my invention is possible in the light of the above teachings. Thus, the transformers may be replaced with capacitors in certain applications or may not be required in some applications. Further, the electronic amplifiers 14, 19, 20 and 32 need not be operational amplifiers and may be more conventional type electronic amplifiers such as conventional single or dual stage transistor amplifiers, although the operational amplifier is preferred due to its high input impedance, low output impedance, and other characteristics. Thus, it is to be understood that changes may be made in the particular embodiment of my invention as described which are within the full intended scope of the invention as defined by the appended claims.

What is claimed is:

1. An adaptive hybrid circuit for connection between a full duplex communications channel including transmit and receive ports and a half duplex communications channel including a single port, comprising:
   a first signal path between said receive port of said full duplex communications channel, and said single port of said half duplex communications channel, said first signal path including first impedance means therein for at least partially isolating said receive port from said single port;
   a second signal path between said single port of said half duplex communications channel and said transmit port of said full duplex communications channel, said second signal path including cancelling means;
   impedance synthesizer means connected between said first and second signal paths for synthesizing a cancelling signal from the signal appearing at said receive port of said full duplex channel, and applying said cancelling signal to said cancelling means so that only the signal from the single port of said half duplex communications channel appears at said transmit port of said full duplex communications channel.

2. The circuit of claim 1 wherein said first signal path comprises:
   first amplifier means having first input connected to said receive port of said full duplex communications channel and an output connected to said first impedance means, said impedance synthesizer means having an input thereof connected to the juncture of said first amplifier and said first impedance means.

3. The circuit of claim 2 wherein said cancelling means comprises:
   differential amplifier means having positive and negative inputs for selectively summing said signal from said single port of said half duplex communications channel with said cancelling signal from said impedance synthesizer means to provide a signal at the output of said amplifier characterized by including only said signal from said single port of said half duplex communcations channel.

4. The circuit of claim 2 wherein said cancelling means includes summing means, and said cancelling signal includes components of the signal at said receive port of said full duplex communications channel opposite in phase to the components of the signal at said receive port of said full duplex communications channel which are present in said second signal path before said cancelling means, so that said summing means cancels said components of said signal from said receive port of said full duplex communications channel from said second signal path and only said signals from said single port of said half duplex communications channel appear at said transmit port of said full duplex communications channel.

5. An adaptive hybrid circuit for interfacing a four-wire communication channel with a two-wire communication channel and comprising:
   a first electronic amplifier having a first input connected through a first resistor to a receive port of a four-wire communication channel, the receive port being defined by a first pair of terminals, said first resistor having a resistance such that the four-wire receive channel is terminated in its characteristic impedance;
   fixed impedance means connected between an output of said first amplifier and a port of a two-wire channel for termination thereof in its nominal characteristic impedance, the two-wire channel port being defined by a second pair of terminals;
   a second electronic amplifier having a first polarity input terminal to which is applied a first signal which represents a sample of the signal received from the four-wire receive channel, said second amplifier having a second amplifier having a second polarity input terminal to which is applied a fixed reference potential, a selected one of the first and second polarity input terminals connected to said fixed impedance means for applying to the selected polarity input terminal a second signal sensed at said fixed impedance means when said four-wire receive channel is activated and for applying only to the selected polarity input terminal a signal supplied to the two-wire channel port from the two-wire channel when said two-wire channel is activated, the selection of the polarity input terminal of said second amplifier being determined by the phase relationships of the first and second signals at inputs to the amplifier terminals in order to obtain cancellation therebetween at said second amplifier, said second amplifier having an output connected through a second resistor to a transmit port of the four-wire channel, the transmit port being defined by a third pair of terminals, said second resistor having a resistance such that the four-wire transmit channel is terminated in its characteristic impedance, said second amplifier providing a nulling of the first and second signals applied to the input terminals thereof when said four-wire receive channel is activated so as to isolate the four-wire transmit port from the four-wire receive port independent of variation in the impedance characteristics of the two-wire channel due to signal loss in said fixed impedance means swamping out such impedance variations;
   impedance synthesizer network means having a first input connected to the output of said first amplifier and a first output connected to a selected one of said first and second polarity input terminals of said second amplifier for providing a high degree of precision of the nulling at the output of said second amplifier so as to obtain improved isolation between the four-wire receive and transmit ports in the order of 12 dB or more over that obtained with the conventional transformer hybrid circuit and without the need for an externally adjustable compromise termination network, the first output of said impedance synthesizer network means producing the first signal applied to said second amplifier; and
   correlation control means having an input signal first input connected to a second output of said impedance synthesizer network means, an error signal second input connected to the output of said second amplifier, a third input connected to a third output of said impedance synthesizer network means, and an output connected to a second input of said impedance synthesizer network means for adaptively controlling the operation thereof so that the high degree of precision of the null at the output of said second amplifier is maintained throughout the operation of the adaptive hybrid circuit.

6. The adaptive hybrid circuit set forth in claim 5 and further comprising:
means connected in circuit relationship with said first amplifier for providing an adjustable gain thereto for compensating for the signal loss in said fixed impedance means in its passage from the four-wire receive port to the two-wire port so as to provide a zero dB loss between the ports.

7. The adaptive hybrid circuit set forth in claim 6 wherein:
said adjustable gain means is a variable third resistor connected from the output of said first amplifier to said input thereof so that the gain is determined by the ratio of resistances of the third resistor to that of the first resistor.

8. The adaptive hybrid circuit set forth in claim 7 and further comprising:
a fourth resistor connected between the output of said first amplifier and the first input of said fixed impedance means;
the connection to the second input terminal of said second amplifier being from the juncture of said fourth resistor and the first input of said fixed impedance means.

9. The adaptive hybrid circuit set forth in claim 5 wherein:
said impedance synthesizer network means has the first output thereof connected to the first polarity input terminal of the second amplifier for applying the first signal thereto.

10. The adaptive hybrid circuit set forth in claim 5 wherein:
said impedance synthesizer network means has the first output thereof connected to the first input of said fixed impedance means.

11. The adaptive hybrid circuit set forth in claim 5 and further comprising:
a third electronic amplifier interconnected as a unity gain phase inverter and having an input connected to the output of said first amplifier, output of said third amplifier connected to a second input of said fixed impedance means for providing in conjunction with the connection of said first amplifier output to the first input of said fixed impedance means a double-ended input to said fixed impedance means with respect to the four-wire receive channel;
the first and second polarity input terminals of said second amplifier connected to the junctures of the double-ended input to said fixed impedance means and the outputs of said first and third amplifiers for applying the second signal to the second amplifier; and
a fourth electronic amplifier interconnected as a unity gain phase inverter and having an input connected to the output of said second amplifier, said fourth amplifier having an output connected through a third resistor to the transmit port of the four-wire channel, said second and third resistors each having a resistance equal to one half the characteristic impedance of the four-wire transmit channel to form a balanced output embodiment of the adaptive hybird circuit.

12. The adaptive hybrid circuit set forth in claim 11 and further comprising:
means connected in circuit relationship with said first amplifier for providing an adjustable gain thereto for compensating for loss in the signal in said fixed impedance means in its passage from the four-wire receive port to the two-wire port so as to provide a zero dB loss between the ports.

13. The adaptive hybrid circuit set forth in claim 12 wherein:
said adjustable gain means is a variable fourth resistor connected from the output of said first amplifier to said first input thereof so that the gain is determined by the ratio of resistances of the fourth resistor to that of the first resistor.

14. The adaptive hybrid circuit set forth in claim 13 and further comprising:
a fifth resistor connected between the output of said first amplifier and the first input of the double-ended input of said fixed impedance means;
a sixth resistor connected between the output of said third amplifier and the second input of the double-ended input of said fixed impedance means;
said fixed impedance means is a balanced impedance network having the double-ended input thereof connected to saif fifth and sixth resistors, and having a double-ended output connected to said two-channel port;
the first and second polarity input terminals of said second amplifier connected to the junctures of said fifth and sixth resistors with the double-ended input to said fixed impedance means for applying the second signal to the second amplifier.

15. The adaptive hybrid circuit set forth in claim 14 wherein:
the first signal to said second amplifier is connected from the output of said first amplifier through a seventh resistor to the same polarity input terminal of the second amplifier which is connected to the juncture of the sixth resistor and the second input of the double-ended input to said fixed impedance means.

16. The adaptive hybrid circuit set forth in claim 14 wherein:
the first signal to said second amplifier is connected from the output of said third amplifier through a seventh resistor to the same polarity input terminal of the second amplifier which is connected to the juncture of the fifth resistor and the first input of the double-ended input to said fixed impedance means.

17. The adpative hybrid circuit set forth in claim 16 wherein:
said impedance synthesizer network means has the first input thereof connected to the output of said third amplifier;
said seventh resistor having an input end connected to the first output of said impedance synthesizer network means and an output end connected to the first polarity input terminal of said second amplifier.

18. The adaptive hybrid circuit set forth in claim 16 wherein:

said impedance synthesizer network means has the first input thereof connected to the output of said first amplifier and the first output thereof connected to an input end of said fifth resistor.

19. The adaptive hybrid circuit set forth in claim 16 wherein:
said impedance synthesizer network means has the first input thereof connected to the output of said third amplifier and the first output thereof connected to an input end of said sixth resistor.

20. The adaptive hybrid circuit set forth in claim 14 wherein:
said fifth and sixth resistors in conjunction with the output impedance of said first and third amplifiers each have a resistance value equal to one half the nominal characteristic impedance of the two-wire channel.

21. The adaptive hybrid circuit set forth in claim 11 wherein:
said impedance synthesizer network means is a tapped delay line circuit; and
the second input to said impedance synthesizer network means consists of tap weight control signals provided from the output of said correlation control means.

22. The adaptive hybrid circuit set forth in claim 11 wherein:
said first, second, third and fourth electronic amplifiers are electronic operational amplifiers.

23. The adaptive hybrid circuit set forth in claim 5 wherein
said impedance synthesizer network means is a tapped delay line circuit.

24. The adaptive hybrid circuit set forth in claim 5 wherein:
said impedance synthesizer network means is a tapped delay line circuit; and
the second input to said impedance synthesizer network means consists of tap weight control signals provided from the output of said correlation control means.

* * * * *

UNITED STATES PATENT OFFICE
CERTIFICATE OF CORRECTION

Patent No. 3,973,089        Dated August 3, 1976

Inventor(s) Charles M. Puckette

It is certified that error appears in the above-identified patent and that said Letters Patent are hereby corrected as shown below:

In The Abstract, line 2, "wire-to-wire" should read
-- wire-two-wire --.

Column 12, line 22, after "having" first occurrence delete "a second amplifier having".

Signed and Sealed this

Twenty-third Day of November 1976

[SEAL]

Attest:

RUTH C. MASON
*Attesting Officer*

C. MARSHALL DANN
*Commissioner of Patents and Trademarks*